US005539008A

United States Patent [19]
Dams et al.

[11] Patent Number: 5,539,008
[45] Date of Patent: Jul. 23, 1996

[54] FOAMABLE COMPOSITION CONTAINING UNSATURATED PERFLUOROCHEMICAL BLOWING AGENT

[75] Inventors: Rudolf J. Dams, Zwijndrecht, Belgium; Richard M. Flynn, Mahtomedi, Minn.; Koen Focquet, Antwerp, Belgium; John G. Owens, Woodbury, Minn.

[73] Assignee: Minnesota Mining and Manufacturing Company, St. Paul, Minn.

[21] Appl. No.: 174,826

[22] Filed: Dec. 29, 1993

[51] Int. Cl.$^6$ .............................. C08J 9/14; C08K 5/02; C08K 5/03

[52] U.S. Cl. .............. 521/131; 252/182.13; 252/182.15; 252/182.18; 252/182.2; 252/182.23; 252/182.24; 252/182.27; 252/182.28; 521/114; 521/128; 521/170

[58] Field of Search ................ 521/131, 128, 521/114, 170, 131; 252/182.23, 182.15, 182.18, 182.2, 182.24, 182.27, 182.28, 182.13

[56] References Cited

U.S. PATENT DOCUMENTS

| | | | |
|---|---|---|---|
| 3,331,880 | 7/1967 | Anello et al. | 570/160 |
| 3,758,618 | 9/1973 | Deem | 570/138 |
| 3,787,351 | 1/1974 | Olson | 523/453 |
| 4,016,217 | 4/1977 | Fielding et al. | 570/138 |
| 4,205,138 | 5/1980 | Müller et al. | 521/158 |
| 4,221,876 | 9/1980 | Wagner | 521/158 |
| 4,247,653 | 1/1981 | Wagner | 521/158 |
| 4,324,716 | 4/1982 | Reischl et al. | 524/761 |
| 4,326,086 | 4/1982 | Möhring et al. | 568/388 |
| 4,341,909 | 7/1982 | Schneider et al. | 568/863 |
| 4,972,002 | 11/1990 | Volkert | 521/120 |
| 4,972,003 | 11/1990 | Grünbauer et al. | 521/131 |
| 4,981,879 | 1/1991 | Snider | 521/131 |
| 4,997,706 | 3/1991 | Smits et al. | 428/304.4 |
| 5,120,770 | 6/1992 | Doyle et al. | 521/131 |
| 5,137,929 | 8/1992 | Demmin et al. | 521/131 |
| 5,162,384 | 11/1992 | Owens et al. | 521/110 |
| 5,187,206 | 2/1993 | Volkert et al. | 521/129 |
| 5,205,956 | 4/1993 | Volkert et al. | 252/350 |
| 5,210,106 | 5/1993 | Dams et al. | 521/110 |
| 5,211,873 | 5/1993 | Dams et al. | 252/182.24 |
| 5,220,082 | 6/1993 | Krespan | 570/131 |
| 5,254,774 | 10/1993 | Prokop | 570/138 |

FOREIGN PATENT DOCUMENTS

| | | |
|---|---|---|
| 1088523 | 10/1980 | Canada . |
| 2037587 | 9/1991 | Canada . |
| 0416777 | 3/1991 | European Pat. Off. . |
| 0439283 | 7/1991 | European Pat. Off. . |
| 0520860 | 12/1992 | European Pat. Off. . |
| 0543536 | 5/1993 | European Pat. Off. . |
| 2638759 | 3/1978 | Germany . |
| 2706297 | 8/1978 | Germany . |
| 51-79042 | 7/1976 | Japan . |
| 51-79043 | 7/1976 | Japan . |
| 51-79045 | 7/1976 | Japan . |
| 5-247249 | 9/1993 | Japan . |

OTHER PUBLICATIONS

*Derwent World Patent Index*, abstract of JP 51-68807.
*Derwent World Patent Index*, abstract of JP 32-29736.
*Derwent World Patent Index*, abstract of JP 32-29732.
*Derwent World Patent Index*, abstract of JP 32-29729.
Grant & Hackh's, *Cemical Dictionary*, 1987, p. 119.
*Advances in Fluorine Chemistry*, vol. 4 edited by M. Stacey, J. C. Tatlow, and A. G. Sharpe, p. 60, Butterworths, Washington (1965).
Atkinson, R. et al., Adv. Photochem. 11, 375 (1979).
Chambers, R. D., *Fluorine in Organic Chemistry*, pp. 144–148, John Wiley & Sons, New York (1973).
Hudlicky, M., *Chemistry of Organic Fluorine Compounds*, Second Edition, pp. 406–410, Ellis Horwood, New York (1992).
Gambaretto, G., and G. Troilo, Chim. Ind. 52(11), 1097–1102 (1970).
Gambaretto, G., and G. Troilo, Ann. Chim. 59(8–9), 690–701 (1969).
Lovelace, A. M., D. A. Rausch, and W. Postelnek, *Aliphatic Fluorine Compounds*, Chapter III (Alkenes and Alkynes), pp. 107–109, Reinhold Publishing Corporation, New York (1958).
"Montreal Protocol on Substances That Deplete the Ozone Layer", Copenhagen Amendments, United Nations Environment Program, 1992.
*Organofluorine Chemicals and their Industrial Applications* edited by R. E. Banks, pp. 29–32, Ellis Horwood Ltd., Chichester (1979).
Paper presented to the Polyurethanes World Congress 1991 (Sep. 24–26, 1991) entitled "New Surfactant Technology for HCFC–123 and HCFC–141b Blown Rigid Foam Systems" (pp. 191–196).
Rosbotham, D. et al., "HFC–134a—A Zero O.D.P. Option for Rigid Polyurethane Foam", Proceeding of the SPI 34th Annual Polyurethane Technical/Marketing Conference, New Orleans, Louisiana, Oct. 21–24, 1992.
Saunders, J. H. and K. C. Frisch, *High Polymers*, vol. XVI, "Polyurethanes", Part I, pp. 32–54 and 65–88, Interscience, New York (1962).
*Chemical Abstracts*, abstract of EP 0 520 860.

(List continued on next page.)

*Primary Examiner*—James J. Seidleck
*Assistant Examiner*—Rabon Sergent
*Attorney, Agent, or Firm*—Gary L. Griswold; Walter N. Kirn; Lucy C. Weiss

[57] ABSTRACT

Foamable compositions comprise (a) at least one normally liquid, unsaturated perfluorochemical blowing agent compound selected from the group consisting of perfluoroolefin compounds, e.g., perfluoro(4-methylpent-2-ene), perfluoroaromatic compounds, e.g., hexafluorobenzene, and perfluorocycloolefin compounds, e.g., perfluorocyclohexene, the perfluoroolefin compounds optionally containing one or more catenary heteroatoms; and (b) at least one foamable polymer or the precursors of at least one foamable polymer. The compositions are useful in preparing polymeric, e.g., polyurethane, foams.

18 Claims, No Drawings

OTHER PUBLICATIONS

*Derwent World Patent Index,* abstract of EP 0 520 860.
*Derwent World Patent Index,* abstract of JP 51–79042.
*Derwent World Patent Index,* abstract of JP 51–79043.
*Derwent World Patent Index,* abstract of JP 51–79045.

*Derwent World Patent Index,* abstract of JP 52–47249.

*Chemical Abstracts,* abstracts of Gambaretto, G., and G. Troilo, Chim. Ind. 52(11), 1097–1102 (1970) and Gambaretto, G., and G. Troilo, Ann. Chim. 59(8–9), 690–701 (1969).

FOAMABLE COMPOSITION CONTAINING UNSATURATED PERFLUOROCHEMICAL BLOWING AGENT

FIELD OF THE INVENTION

This invention relates to foamable compositions comprising fluorine-containing blowing agent compounds. In other aspects, this invention relates to a process for preparing polymeric foams, e.g., polyurethane foams, to polymeric foams prepared from the foamable compositions, and to articles comprising the foams.

BACKGROUND OF THE INVENTION

Chlorofluorocarbons (hereinafter, CFCs) have been widely used as blowing agents for producing polymeric foams. However, in recent years, CFCs have been shown to contribute to depletion of the earth's ozone layer (due to their chlorine content), as well as to global warming (due to their long atmospheric lifetimes). Thus, there has been general agreement that replacements are needed. (See "Montreal Protocol on Substances That Deplete the Ozone Layer," Copenhagen Amendments, United Nations Environment Program, 1992.)

One approach to developing CFC replacements has been to substitute hydrogen atoms for chlorine atoms so as to provide hydrochlorofluorocarbons (hereinafter, HCFCs) or hydrofluorocarbons (hereinafter, HFCs). HCFCs and HFCs have lower ozone depletion potentials (that of HFCs being zero) and shorter atmospheric lifetimes than CFCs, but their performance as blowing agents is inferior to that of CFCs. (See, e.g., the discussion by D. Rosbotham et al. in "HFC-134a—A Zero O.D.P. Option for Rigid Polyurethane Foam," Proceedings of the SPI 34th Annual Polyurethane Technical/Marketing Conference, New Orleans, Louisiana, Oct. 21–24, 1992. ) Consequently, the search for true replacements has continued.

Perfluorochemicals, as well as various partially-fluorinated materials, have recently been suggested for use in foam blowing. For example, U.S. Pat. Nos. 5,210,106 and 5,211,873 (Dams et al.) disclose blowing agent emulsions comprising one or more low boiling, chlorine-free, perfluorinated compounds.

U.S. Pat. No. 5,162,384 (Owens et al.) describes a blowing agent emulsion comprising at least one low boiling, perfluorinated, N-aliphatic, cyclic 1,3- or 1,4-aminoether.

EP 439,283 (BP Chemicals Limited) discloses blowing agents comprising perfluoro- or partially fluorinated-(cyclo)alkanes.

EP 416,777 (Imperial Chemical Industries) describes a method for the preparation of a polymeric foam which comprises vaporising a fluorine-containing ether in the presence of a foamable polymer or the precursors of a foamable polymer.

U.S. Pat. Nos. 4,972,002 and 5,187,206 (Volkert) disclose blowing agents comprising low-boiling, fluorinated or perfluorinated hydrocarbons and tertiary alkylamines.

U.S. Pat. No. 4,981,879 (Snider) describes the use of perfluorinated hydrocarbons in foam preparation to enhance the thermal insulating properties of the resulting foams.

U.S. Pat. No. 4,997,706 (Smits et al.) discloses the use of a $C_{2-6}$ polyfluorocarbon compound containing no chlorine or bromine atoms as a physical blowing agent in the preparation of rigid, closed-cell, polymer foams.

CA 2,037, 587 (Hoechst Aktiengesellschaft) describes a process for the manufacture of foams with the aid of blowing agents containing fluoroalkanes and fluorinated ethers.

U.S. Pat. No. 4,972,003 (Grunbauer et al.) discloses a blowing agent composition comprising one or more organic compounds, particularly halocarbons, having a boiling point of less than or equal to 272K at atmospheric pressure, which composition is substantially free of organic compounds having a boiling point of 273K or greater.

U.S. Pat. No. 5,205,956 (Volkert et al.) discloses a process for the production of plastic foams, in which the blowing agent used is at least one vinylfluoroalkane.

Japanese Patent Publication Nos. 51-79042, 51-79043, and 51-79045 (Daikin Kogyo KK.) disclose the use of 2-trifluoromethyl-3,3,3-trifluoro-1-propene, cis-1,1,1,4,4,4-hexafluoro-2-butene, and 4-hydro-heptafluoro-1-butene, respectively, as foaming agents.

SUMMARY OF THE INVENTION

Briefly, in one aspect, this invention provides foamable compositions for use in preparing polymeric, e.g., polyurethane, foams. The compositions comprise (a) at least one normally liquid, unsaturated perfluorochemical blowing agent compound selected from the group consisting of perfluoroolefin compounds, e.g., perfluoro(4-methylpent-2-ene), perfluoroaromatic compounds, e.g., hexafluorobenzene, and perfluorocycloolefin compounds, e.g., perfluorocyclohexene, the perfluoroolefin compounds optionally containing one or more catenary, i.e., in-chain, heteroatoms; and (b) at least one foamable polymer or the precursors of at least one foamable polymer. As used herein, the term "normally liquid" means liquid under ambient conditions. (Preferably, the blowing agent compound has a boiling point greater than or equal to about 20° C.) Reactive components which react with one another either during or after foaming to form a foamable polymer are regarded herein as precursors of a foamable polymer. Perfluoroolefins and perfluorocycloolefins are preferred blowing agent compounds due to considerations of cost and availability.

The foamable compositions of the invention comprising unsaturated perfluorochemical as blowing (or co-blowing) agent generally provide polymeric foams having a smaller cell size (and therefore better insulation efficiency) than foams produced using only conventional blowing agents such as CFCs, HCFCs, HFCs, hydrocarbons, hydrochlorocarbons, or water. The compositions of the invention are also more "environmentally friendly" than compositions containing some conventional blowing agents, e.g., CFCs and HCFCs, as the unsaturated perfluorochemical blowing agent compounds utilized in the compositions have an ozone depletion potential of zero. The compounds also advantageously have shorter atmospheric lifetimes (due to their greater reactivity) than saturated perfluorochemical blowing agents, and thus have lower global warming potentials. (See, e.g., R. Atkinson et al., Adv. Photochem. 11, 375 (1979).) Although the unsaturated perfluorochemical blowing agent compounds are known to be highly reactive toward nucleophiles such as alcohols in the presence of basic catalysts such as trialkylamines (see, e.g., *Organofluorine Chemicals and their Industrial Applications* edited by R. E. Banks, pages 29–32, Ellis Horwood Ltd., Chichester (1979); *Advances in Fluorine Chemistry*, Volume 4 edited by M. Stacey, J. C. Tatlow, and A. G. Sharpe, page 60, Butterworths, Washington (1965); and M. Hudlicky, *Chemistry of Organic Fluorine Compounds*, Second Edition, pages 406–10, Ellis Horwood, N.Y. (1992)), the compounds surprisingly function well as blowing agents even in preparing polyurethane foams (where such nucleophiles and catalysts are necessarily present). The apparently latent reactivity of the unsaturated perfluorochemical blowing agents can potentially be utilized to advantage later in the foam-blowing process to chemically "anchor" the blowing agent in the foam to prevent its diffusion and release into the atmosphere, thereby further reducing environmental concerns.

In other aspects, this invention provides a process for preparing polymeric foams, polymeric foams prepared from the foamable compositions of the invention, and articles comprising the foams. The foams can vary in texture from very soft types useful in upholstery applications to rigid foams useful as structural or insulating materials.

DETAILED DESCRIPTION OF THE INVENTION

Unsaturated perfluorochemical blowing agent compounds suitable for use in the foamable compositions of the invention are normally liquid perfluoroolefin compounds, perfluoroaromatic compounds, and perfluorocycloolefin compounds. The compounds can contain some residual carbon-bonded hydrogen (generally less than about 0.4 mg/g and preferably less than about 0.1 mg/g, e.g., 0.01 to 0.05 mg/g) but are preferably substantially completely fluorinated. The perfluoroolefin compounds can contain one or more catenary heteroatoms, e.g., nitrogen or oxygen atoms. Representative examples of suitable blowing agent compounds include hexafluoropropene dimers, e.g., perfluoro(4-methylpent-2-ene) and perfluoro(2-methylpent-2-ene); hexafluoropropene trimers, e.g., perfluoro(4-methyl-3-isopropylpent-2-ene) and perfluoro(2,4-dimethyl-3-ethylpent-2-ene); tetrafluoroethylene oligomers, e.g., perfluoro(3-methylpent-2-ene), perfluoro(3,4-dimethylhex-3-ene), and perfluoro(2,4-dimethyl-4-ethylhex-2-ene); perfluoro(1-pentene); perfluoro(2-pentene); perfluoro(1-hexene); perfluoro(2 -hexene); perfluoro( 3hexene); perfluoro(1-heptene); perfluoro(2-heptene); perfluoro(3-heptene); hexafluorobenzene; octafluorotoluene; decafluoro-o-xylene; decafluoro-m-xylene; decafluoro-p-xylene; perfluorocyclopentene; isomers of $C_6F_{10}$, e.g., perfluorocyclohexene, perfluoro(1-methylcyclopentene), perfluoro(3-methylcyclopentene), and perfluoro(4methylcyclopentene); perfluoro(1-methylcyclohexene); perfluoro(3-methylcyclohexene); perfluoro(4-methylcyclohexene); perfluoro(oxaalkenes), e.g., perfluoro(3-oxahex-1-ene), perfluoro(3-oxahept-1-ene), and perfluoro(3-oxa-4-methylpent-1-ene); perfluoro(3-ethyl-3-azapent-1-ene); and mixtures thereof.

For use in the compositions of the invention, the unsaturated perfluorochemical blowing agent compounds preferably have boiling points greater than or equal to about 20° C. More preferably, the compounds have boiling points in the range of from about 45° C. to about 125° C. Compounds having such boiling points are well-suited for foam blowing at atmospheric pressure. Perfluoroolefins and perfluorocycloolefins are preferably utilized in the compositions of the invention due to considerations of cost and availability. More preferably, perfluoroolefins are utilized because of the wide range of boiling points available.

Perfluoroolefin compounds (as well as catenary heteroatom-containing perfluoroolefin compounds) suitable for use in the foamable compositions of the invention can be prepared by methods such as the decarboxylation of salts of fluorocarboxylic acids (see, e.g., A.M. Lovelace, D. A. Rausch, and W. Postelnek, *Aliphatic Fluorine Compounds*, Chapter III (Alkenes and Alkynes), pages 107–09, Reinhold Publishing Corporation, New York (1958)) and the coupling of two or more perfluoroolefins (as described, e.g., in U.S. Pat. No. 5,220,082 (Krespan), the description of which is incorporated herein by reference). (See also R. D. Chambers, *Fluorine in Organic Chemistry*, pages 144–48, John Wiley & Sons, New York (1973).) Hexafluoropropene oligomers can be prepared by various gas-phase and liquid-phase methods such as those described in, e.g., U.S. Pat. No. 5,254,774 (Prokop), the descriptions of which are incorporated herein by reference. Hexafluoropropene dimer and a mixture of hexafluoropropene trimers are also commercially available (e.g., from Fluorochem Limited). Tetrafluoroethylene oligomers can be prepared by methods such as those described in, e.g., U.S. Pat. No. 3,758,618 (Deem) and U.S. Pat. No. 4,016,217 (Fielding et al.), the descriptions of which are incorporated herein by reference.

Perfluorocycloolefin compounds suitable for use in the foamable compositions of the invention can be prepared by the electrochemical fluorination of aromatic acid derivatives followed by decarboxylation, as described for perfluorocyclohexene by G. Gambaretto and G. Troilo in Chim. Ind. 52(11), 1097–102 (1970) and Ann. Chim. 59(8–9), 690–701 (1969). See also Chambers, supra. In addition, see U.S. Pat. No. 3,331,880 (Anello et al.) which describes methods for preparing polyfluorocyclohexenes, the descriptions of which are incorporated herein by reference. Perfluorocyclohexene is also commercially available (e.g., from Fluorochem Limited).

Perfluoroaromatic compounds suitable for use in the foamable compositions of the invention can be prepared by various methods (such as the defluorination of perfluorocycloalkanes) described, e.g., in Chambers, supra, pages 261–73. Hexafluorobenzene is commercially available (e.g., from Fluorochem Limited).

The unsaturated perfluorochemical blowing agents can be used alone as the sole blowing agent in the foamable composition or can be used in combination with saturated perfluorochemical blowing agents or with conventional blowing agents, e.g., CFCs, HCFCs, HFCs, hydrocarbons, hydrochlorocarbons (HCCs), or water. Mixtures of unsaturated perfluorochemical and other blowing agent(s) are generally preferred due to cost considerations. Representative examples of suitable co-blowing agents include hydrocarbons, e.g., pentane, hexane, and cyclopentane; halohydrocarbons, e.g., 1,1-dichloro-1-fluoroethane, 1,1-dichloro-2,2,2-trifluoroethane, 1-hydropentadecafluoroheptane, 1,1,1,2-tetrafluoroethane, chlorodifluoromethane, 1-chloro-1,1-difluoroethane, and 2-chloropropane; chlorofluorocarbons, e.g., fluorotrichloromethane; water (which reacts with isocyanate to produce carbon dioxide); saturated perfluorochemicals, e.g., perfluoropentane, perfluorohexane, and perfluoro(N-methylmorpholine); and mixtures thereof. Preferred co-blowing agents are normally liquid blowing agent compounds, e.g., 1,1-dichloro-1-fluoroethane, cyclopentane, pentane, hexane, water, and perfluoro(N-methylmorpholine). When it is desirable to mix at least one co-blowing agent with at least one perfluorochemical blowing agent compound of the invention, co-blowing agent can generally be utilized in an amount in the range of from about 0.5 to about 99.5 weight percent (preferably, from about 40 to about 95 weight percent, more preferably from about 75 to about 90 weight percent) of the blowing agent mixture.

Foamable polymers suitable for use in the foamable compositions of the invention include polyolefins, e.g., polystyrene, poly(vinyl chloride), and polyethylene. Foams can be prepared from styrene polymers using conventional extrusion methods. The blowing agent(s) can be injected into a heat-plastified styrene polymer stream within an extruder and admixed therewith prior to extrusion to form foam. Representative examples of suitable styrene polymers include the solid homopolymers of styrene, α-methylstyrene, ring-alkylated styrenes, and ring-halogenated styrenes, as well as copolymers of these monomers with minor amounts of other readily copolymerizable olefinic monomers, e.g., methyl methacrylate, acrylonitrile, maleic anhydride, citraconic anhydride, itaconic anhydride, acrylic acid, N-vinylcarbazole, butadiene, and divinylbenzene. Suitable vinyl chloride polymers include vinyl chloride homopolymer and copolymers of vinyl chloride with other vinyl monomers. Ethylene homopolymers and copolymers of ethylene with, e.g., 2-butene, acrylic acid, propylene, or butadiene are also useful. Mixtures of different types of polymers can be employed.

Precursors of foamable polymers suitable for use in the foamable compositions of the invention include precursors of phenolic polymers, silicone polymers, and isocyanate-based polymers, e.g., polyurethane, polyisocyanurate, polyurea, polycarbodiimide, and polyimide. Precursors of isocyanate-based polymers are preferred, as the unsaturated perfluorochemical blowing agent compounds utilized in the foamable compositions of the invention are especially useful for preparing polyurethane or polyisocyanurate foams. Thus, preferred foamable compositions of the invention comprise (a) at least one normally liquid blowing agent compound selected from the group consisting of perfluoroolefin compounds, perfluoroaromatic compounds, and perfluorocycloolefin compounds, the perfluoroolefin compounds optionally containing one or more catenary heteroatoms; (b) at least one organic polyisocyanate; and (c) at least one compound containing at least two reactive hydrogen atoms.

Polyisocyanates suitable for use in the preferred compositions of the invention include aliphatic, alicyclic, arylaliphatic, aromatic, or heterocyclic polyisocyanates, or combinations thereof. Any polyisocyanate which is suitable for use in the production of polymeric foams can be utilized. Of particular importance are aromatic diisocyanates such as toluene and diphenylmethane diisocyanates in pure, modified, or crude form. MDI variants (diphenylmethane diisocyanate modified by the introduction of urethane, allophanate, urea, biuret, carbodiimide, uretonimine, or isocyanurate residues) and the mixtures of diphenylmethane diisocyanates and oligomers thereof known in the art as crude or polymeric MDI (polymethylene polyphenylene polyisocyanates) are especially useful.

Representative examples of suitable polyisocyanates include ethylene diisocyanate, 1,4-tetramethylene diisocyanate, 1,6-hexamethylene diisocyanate, trimethyl hexamethylene diisocyanate, 1,12-dodecane diisocyanate, cyclobutane-1,3-diisocyanate, cyclohexane-1,3- and -1,4-diisocyanate (and mixtures of these isomers), diisocyanato-3,3,5-trimethyl-5-isocyanatomethyl cyclohexane, 2,4- and 2,6toluene diisocyanate (and mixtures of these isomers), diphenylmethane-2,4'- and/or -4,4'-diisocyanate, naphthalene-1,5-diisocyanate, the reaction products of four equivalents of the aforementioned isocyanate-containing compounds with compounds containing two isocyanate-reactive groups, triphenyl methane-4,4',4"-triisocyanate, polymethylene polyphenylene polyisocyanates, m- and p-isocyanatophenyl sulfonyl isocyanates, perchlorinated aryl polyisocyanates, polyisocyanates containing carbodiimide groups, norbornane diisocyanates, polyisocyanates containing allophanate groups, polyisocyanates containing isocyanurate groups, polyisocyanates containing urethane groups, polyisocyanates containing acrylated urea groups, polyisocyanates containing biuret groups, polyisocyanates produced by telomerization reactions, polyisocyanates containing ester groups, reaction products of the above-mentioned diisocyanates with acetals, polyisocyanates containing polymeric fatty acid esters, and mixtures thereof. Distillation residues (obtained in the commercial production of isocyanates) having isocyanate groups can also be used alone or in solution in one or more of the above-mentioned polyisocyanates.

Reactive hydrogen-containing compounds suitable for use in the preferred foamable compositions of the invention are those having at least two isocyanate-reactive hydrogen atoms, preferably in the form of hydroxyl, primary or secondary amine, carboxylic acid, or thiol groups, or a combination thereof. Polyols, i.e., compounds having at least two hydroxyl groups per molecule, are especially preferred due to their desirable reactivity with polyisocyanates. Preferred polyols are those having from 2 to about 50, preferably from 2 to about 8, more preferably from 2 to about 4, hydroxyl groups. Such polyols can be, e.g., polyesters, polyethers, polythioethers, polyacetals, polycarbonates, polymethacrylates, polyester amides, or hydroxyl-containing prepolymers of these compounds and a less than stoichiometric amount of polyisocyanate. Generally, the reactive hydrogen-containing compounds utilized in the preferred foamable compositions of the invention have a weight average molecular weight of from about 50 to about 50,000, preferably from about 500 to about 25,000.

Representative examples of suitable reactive hydrogen-containing compounds have been described, e.g., by J. H. Saunders and K. C. Frisch in *High Polymers*, Volume XVI, "Polyurethanes," Part I, pages 32–54 and 65–88, Interscience, New York (1962). Mixtures of such compounds are also useful, and, in some cases, it is particularly advantageous to combine low-melting and high-melting polyhydroxyl-containing compounds with one another, as described in DE 2,706,297 (Bayer AG). Useful polyols include ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis(hydroxymethyl)cyclohexane, 2-methyl-1,3-propane diol, dibromobutene diol, glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher polypropylene glycols, dibutylene glycol, higher polybutylene glycols, 4,4'-dihydroxydiphenyl propane, and dihydroxymethyl hydroquinone. Other suitable polyols include the condensation products of polybasic acids and polyols such as polyethylene adipate and polycaprolactone-based polyols, as well as the mixtures of hydroxy aldehydes and hydroxy ketones ("formose") and the polyhydric alcohols obtained therefrom by reduction ("formitol") that are formed in the autocondensation of formaldehyde hydrate in the presence of metal compounds as catalysts and compounds capable of enediol formation as co-catalysts (see, e.g., U.S. Pat. No. 4,341,909 (Schneider et al.), U.S. Pat. No. 4,247,653 (Wagner), U.S. Pat. No. 4,221,876 (Wagner), U.S. Pat. No. 4,326,086 (Mohring et al.), and U.S. Pat. No. 4,205,138 (Muller et al.), as well as CA 1,088,523 (Bayer AG)). Solutions of polyisocyanate polyaddition products, particularly solutions of polyurethane ureas containing ionic groups and/or solutions of polyhydrazodicarbonamides, in low molecular weight polyhydric alcohols can also be used (see DE 2,638,759).

Many other compounds containing isocyanate-reactive hydrogen atoms are useful in the preferred foamable compositions of the invention, as will be apparent to those skilled in the art of polyurethane science and technology.

In general, polymeric foams can be prepared using the foamable compositions of the invention by vaporizing at least one normally liquid, unsaturated perfluorochemical blowing agent compound selected from the group consisting of perfluoroolefin compounds, perfluoroaromatic compounds, and perfluorocycloolefin compounds, the perfluoroolefin compounds optionally containing one or more catenary heteroatoms, in the presence of at least one foamable polymer or the precursors of at least one foamable polymer. The amount of blowing agent compound (or mixture of blowing agent compounds, which may contain co-blowing agent) utilized is preferably up to about 30% by weight of the foamable composition Polymeric foams can be prepared using the preferred foamable compositions of the invention by vaporizing (e.g., by utilizing the heat of precursor reaction) at least one normally liquid, unsaturated perfluorochemical blowing agent compound in the presence of at least one organic polyisocyanate and at least one compound containing at least two reactive hydrogen atoms. Preferably, from about 0.1 to about 50 parts by weight of blowing agent compound(s) is used in combination with from about 100 to about 300 parts by weight of polyisocyanate(s) and from about 100 to about 150 parts by weight of reactive hydrogen-containing compound(s). In making a polyisocyanate-based foam, the polyisocyanate, reactive hydrogen-containing compound, and blowing agent can generally be combined, thoroughly mixed (using, e.g., any of the various known types of mixing head and spray apparatus), and permitted to expand and cure into a cellular polymer. It is often convenient, but not necessary, to preblend certain of the components of the foamable composition prior to reaction of the polyisocyanate and the reactive hydrogen-containing compound. For example, it is often useful to first blend the reactive hydrogen-containing compound, blowing agent, and any other components (e.g., surfactant) except the polyisocyanate, and to then combine the resulting mixture with the polyisocyanate. Alternatively, all components of the foamable composition can be introduced separately. It is also possible to pre-react all or a portion of the reactive hydrogen-containing compound with the polyisocyanate to form a prepolymer.

Other conventional components of foam formulations can optionally be present in the foamable compositions of the invention. For example, cross-linking or chain-extending agents, foam-stabilizing agents or surfactants, catalysts, fire-retardants, and other blowing agents (or blowing agent precursor compounds) can be utilized. Other possible components include cell regulators, fillers, colorants, fungicides, bactericides, antioxidants, reinforcing agents, antistatic agents, and other additives or processing aids known to those skilled in the art.

Preferably, the foamable compositions of the invention include at least one surfactant. Suitable surfactants include fluorochemical surfactants, organosilicone surfactants, polyethylene glycol ethers of long chain alcohols, tertiary amine or alkanolamine salts of long chain alkyl acid sulfate esters, alkyl sulfonate esters, alkyl arylsulfonic acids, fatty acid alkoxylates, and mixtures thereof. Surfactant is generally employed in amounts sufficient to stablilize the foaming reaction mixture against collapse and the formation of large, uneven cells. Typically, from about 0.1 to about 5 percent by weight of surfactant is sufficient for this purpose. Organosilicone surfactants and fluorochemical surfactants are preferred.

The preferred foamable compositions of the invention which are useful in preparing isocyanate-based foams often advantageously contain cross-linking and/or chain-extending agents to modify the mechanical properties of the resulting foams, as well as catalysts to increase the rate of reaction of the components of the composition. Suitable cross-linking or chain-extending agents include aliphatic, alicyclic, and arylaliphatic polyols and polyamines having a molecular weight of less than about 400 and preferably containing from about 2 to about 20 carbon atoms. Representative examples of suitable polyols include ethylene glycol, 1,3-propanediol, 1,10-decanediol, o-, m-, and p-dihydroxycyclohexane, diethylene glycol, dipropylene glycol, 1,4-butanediol, 1,6-hexanediol, bis(2-hydroxyethyl)hydroquinone, 1,2,4- and 1,3,5-trihydroxycyclohexane, glycerol, trimethylolpropane, low molecular weight hydroxyl group-containing polyalkylene oxides based on ethylene oxide and 1,2-propylene oxide, and mixtures thereof. Other useful cross-linking or chain-extending agents include polyamines such as primary aromatic diamines, secondary aromatic diamines, and 3,3'-di- or 3,3',5,5'-tetraalkyl-substituted diaminodiphenylmethanes. The cross-linking and chain-extending agents can be used individually or as mixtures and, when used, can generally be present in amounts ranging from about 2 to about 60 weight percent of the foamable composition.

Catalysts suitable for use in the preferred foamable compositions of the invention include compounds which greatly accelerate the reaction of the reactive hydrogen-containing compounds (or the cross-linking or chain-extending agents) with the polyisocyanates. When used, catalysts are generally present in amounts sufficient to be catalytically effective. Suitable catalysts include organic metal compounds (preferably, organic tin compounds), which can be used alone or, preferably, in combination with strongly basic amines. Representative examples of these and other types of suitable catalysts are described in U.S. Pat. No. 4,972,002 (Volkert), the descriptions of which are incorporated herein by reference.

Foams prepared from the foamable compositions of the invention can vary in texture from very soft types useful in upholstery applications to rigid foams useful as structural or insulating materials. The foams can be used, for example, in the automobile, shipbuilding, aircraft, furniture, and athletic equipment industries, and are especially useful as insulation materials in the construction and refrigeration industries.

This invention is further illustrated by the following examples, but the particular materials and amounts thereof recited in these examples, as well as other conditions and details, should not be construed to unduly limit this invention. In regard to the thermal conductivity data set forth in the examples, note that a paper presented to the Polyurethanes World Congress 1991 (Sep. 24–26, 1991) entitled "New Surfactant Technology for HCFC-123 and HCFC-141b Blown Rigid Foam Systems" (pages 191–96) indicated that decreases in thermal conductivity values of as little as 0.28 milliwatts per meter per degree Kelvin $(mW[m(K)]^{-1})$ were considered to be significant improvements.

EXAMPLES

In the following examples, the thermal conductivity (lambda) values of the resulting foams were measured on a Hesto Lambda Control A50-A thermal conductivity analyzer with a reproducibility of ± 0.1. The comparative cell sizes described in the examples are designated as follows:

| | |
|---|---|
| very fine | 70–100 micrometers |
| fine | 100–150 micrometers |
| medium | 150–200 micrometers |
| large | greater than 200 micrometers |

Example 1

Preparation of Polyurethane Foam Using a Blowing Agent Mixture Comprising Perfluoroolefin Compound and Water 3.5 parts by weight (pbw) of hexafluoropropene (HFP) dimer (from Hoechst AG; believed to be predominately perfluoro(4-methylpent-2-ene)) was emulsified in 119 pbw of a polymeric polyether polyol having a hydroxy equivalent weight of 425 milligrams KOH/gram, a viscosity of 820 cp, a water content of 4.6 pbw, and a catalyst content of 3.7 pbw of N,N-dimethylcyclohexyl amine (this polyol is commercially available as Baytherm™ VP-PU 1751A/2 from Bayer A.G.) using 3.5 pbw of a silicone surfactant (available as B-8423 from T. H. Goldschmidt) and a Pendraulic LD-50 high shear mixer at 2000 rpm. 227 pbw of a polymeric diisocyanate having an isocyanate content of 31.5% by weight and a viscosity of 200 ± 40 cp at 25° C. (commercially available as Desmodur™ 44V20 from Bayer A.G.) was then added to the resulting emulsion with stirring (at the above speed for 10 seconds). The resulting mixture was poured into a 350 cm by 350 cm by 60 cm aluminum mold preheated to 50° C. The resulting foam had a density of 39.3 kg/m$^3$ and a uniform distribution of fine, closed cells. (The closed cell content was greater than 95%.) The thermal conductivity of a section of the foam was measured as described above and found to be 22.3 mW[m(K)]$^{-1}$ initially and 30.7 mW[m(K)]$^{-1}$ after two weeks of aging at 50° C.

Example 2

Preparation of Polyurethane Foam Using a Blowing Agent Mixture Comprising Perfluoroolefin Compound and Water A polyurethane foam was prepared essentially according to the procedure of Example 1 (the components and their amounts are given in Table 1) except that 3.5 pbw of an oligomeric fluorochemical surfactant (described in Example 1 of U.S. Pat. No. 3,787,351 (Olson) (hereinafter, '351)) was substituted for the silicone surfactant. The density, cell size, and thermal conductivity data for the resulting foam are shown in Table 1.

Examples 3–10

Preparation of Polyurethane Foams Using Blowing Agent Mixtures Comprising Water and One of Various Unsaturated Perfluorochemical Compounds Polyurethane foams were prepared essentially according to the procedure of Example 1, using the components and amounts listed in Table 1. The $C_6F_{10}$ (perfluorocyclohexene) utilized in Examples 7 and 8 was purchased from Fluorochem Limited (United Kingdom) and is available as F05931. The tetrafluoroethylene (TFE) oligomer utilized in Examples 3 and 4 was purchased from ICI (United Kingdom) and is believed to be a mixture of tetramer, pentamer, and hexamer. The density, cell size, and thermal conductivity data for the resulting foams are shown in Table 1.

Comparative Example A

Preparation of Polyurethane Foam Using Only Water as Blowing Agent

A polyurethane foam was prepared essentially according to the procedure of Example 1 (the components and their amounts are given in Table 1) but without the addition of HFP dimer. The density, cell size, and thermal conductivity data for the resulting foam are shown in Table 1.

Comparative Example B

Preparation of Polyurethane Foam Using Only Water as Blowing Agent

A polyurethane foam was prepared essentially as in Example 2 (the components and their amounts are given in Table 1) but without the addition of HFP dimer. The density, cell size, and thermal conductivity data for the resulting foam are shown in Table 1.

By comparing Examples 1–10 with Comparative Examples A and B, it can be seen that the foams prepared using foamable compositions of the present invention comprising unsaturated perfluorochemical blowing agent compound have improved thermal conductivity values relative to the foams prepared using only water as the blowing agent.

TABLE 1

| | Amount of Component (Parts by Weight) Example No. | | | | | | | | | | | |
|---|---|---|---|---|---|---|---|---|---|---|---|---|
| Component | 1 | 2 | 3 | 4 | 5 | 6 | 7 | 8 | 9 | 10 | A | B |
| Polyol 1751A/2 (water content of 4.6 pbw) | 119 | 119 | 119 | 119 | 119 | 119 | 119 | 119 | 119 | 119 | 119 | 119 |
| Isocyanate 44V20 | 227 | 227 | 227 | 227 | 227 | 227 | 227 | 227 | 227 | 227 | 227 | 227 |
| Silicone surfactant B-8423 | 3.5 | | 3.5 | | 3.5 | | 3.5 | | 3.5 | | 3.5 | |
| Fluorochemical surfactant (of '351) | | 3.5 | | 3.5 | | 3.5 | | 3.5 | | 3.5 | | 3.5 |
| HFP Dimer | 3.5 | 3.5 | | | | | | | | | | |
| TFE Oligomer | | | 3.5 | 3.5 | | | | | | | | |
| $C_6F_{10}$ | | | | | | | 3.5 | 3.5 | | | | |
| $C_4F_9OCF=CF_2$ (Perfluoro(3-oxahept-1-ene)) | | | | | 3.5 | 3.5 | | | | | | |
| Hexafluorobenzene | | | | | | | | | 3.5 | 3.5 | | |
| Density (kg/m$^3$) | 39.3 | 39.6 | 40.4 | 39.8 | 40.5 | 39.9 | 39.4 | 40.0 | 40.0 | 40.0 | 40.2 | 39.5 |
| Initial Thermal Conductivity (mW[m(K)]$^{-1}$) | 22.3 | 22.3 | 22.8 | 22.3 | 22.7 | 22.4 | 22.7 | 22.5 | 24.3 | 22.5 | 24.1 | 23.6 |
| Aged Thermal Conductivity | 30.7 | 31.4 | 30.2 | 30.7 | 31.4 | 30.8 | 30.9 | 30.5 | 31.3 | 31.3 | 33.1 | 33.2 |

TABLE 1-continued

| | Amount of Component (Parts by Weight) Example No. | | | | | | | | | | | |
|---|---|---|---|---|---|---|---|---|---|---|---|---|
| Component | 1 | 2 | 3 | 4 | 5 | 6 | 7 | 8 | 9 | 10 | A | B |
| (mW[m(K)]$^{-1}$]) (2 weeks at 50° C.) | | | | | | | | | | | | |
| Average Cell Size | Fine | Fine | Very Fine | Very Fine | Fine | Fine | — | — | — | — | Med. | Med. |

Examples 11 and 12

Preparation of Polyurethane Foams Using Blowing Agent Mixtures Comprising Perfluoroolefin Compound and Water Polyurethane foams were prepared essentially as in Example 2, using the components and amounts listed in Table 2. The polymeric polyether polyol utilized had an average molecular weight of 630, a viscosity of about 2000 cp, and a hydroxy content of about 6 hydroxyl groups per molecule. The polyol can be prepared by the reaction of sorbitol with propylene oxide and is commercially available from ICI as Polyol ICI-C. The isocyanate utilized (Dow Chemical Company's PAPI™ 135) was a polymeric methylene diphenyldiisocyanate having an isocyanate equivalent of 132. PAPI™ 135 is no longer available from Dow and has been replaced by PAPI™ 27, an equivalent product having less color. The HFP trimer utilized in Example 12 was purchased from Hoechst AG and is believed to be a mixture of predominately perfluoro(4-methyl-3-isopropylpent-2-ene) and perfluoro(2,4-dimethyl-3-ethylpent-2-ene). The thermal conductivity data for the resulting foams is shown in Table 2.

Example 12A

Preparation of Polyurethane Foam Using Perfluoroolefin Compound as the Sole Blowing Agent Polyurethane foam was prepared essentially as in Example 2, using the components and amounts listed in Table 2 for Example 12, except that no water was added and 90 pbw of HFP trimer was utilized. The thermal conductivity of a section of the foam was measured as described above and found to be 22.0 mW[m(K)]$^{-1}$ initially and 25.8 mW[m(K)]$^{-1}$ after one week of aging at 70° C.

Comparative Examples C, D, E, and F

Preparation of Polyurethane Foams Using Blowing Agent Mixtures Comprising Only Water and One of Various Conventional Blowing Agents Polyurethane foams were prepared essentially as in Examples 11 and 12 (using the components and amounts listed in Table 2) except that various conventional blowing agents were substituted for the perfluoroolefin compounds. The polyol used in Comparative Example E was Polyol Bayer PU 1732, having a viscosity of about 1200 cp and a hydroxy equivalent weight of about 400 mg KOH/g. The thermal conductivity data for the resulting foams is shown in Table 2. This data (when compared with the data for Examples 11 and 12) indicates that foamable compositions of the present invention comprising unsaturated perfluorochemical blowing agent compound can produce foams having conductivities superior or equivalent to those of foams blown with conventional blowing agents. The compositions thus provide alternatives to the use of blowing agents which deplete atmospheric ozone (such as 1,1-dichloro-2,2,2-trifluoroethane) or which are flammable (such as cyclopentane).

TABLE 2

| | Amount of Component (Parts by Weight) Example No. | | | | | |
|---|---|---|---|---|---|---|
| Component | 11 | 12 | C | D | E | F |
| Polyol ICI-C | 150 | 150 | 150 | 150 | | 150 |
| Polyol Bayer PU 1732 | | | | | 200 | |
| Isocyanate PAPI ™ 135 | 187.5 | 187.5 | 187.5 | 187.5 | 300 | 187.5 |
| Silicone Surfactant B-8423 | | | | 4.5 | 6 | |
| Fluorochemical Surfactant (of '351) | 4.5 | 4.5 | 4.5 | | | 4.5 |
| Water | 3 | 3 | 3 | 3 | 4 | 3 |
| Catalyst (N,N-dimethylcyclohexyl amine) | 3.75 | 3.75 | 3.75 | 3.75 | 3.75 | 3.75 |
| Cyclopentane | | | | | 15.7 | |
| 1,1-Dichloro-2,2,2-trifluoroethane | | | | 20.1 | | 25.1 |
| Perfluoropentane | | | 47.1 | 9.5 | | |
| HFP Dimer | 47.1 | | | | | |
| HFP Trimer | | 47.1 | | | | |
| Initial Thermal Conductivity (mW[m(K)]$^{-1}$]) | 22.9 | 24.2 | 22.4 | 24.8 | 22.4 | 22.3 |
| Aged Thermal Conductivity (mW[m(K)]$^{-1}$]) (1 week at 70° C.) | 27.0 | 27.3 | 26.4 | 25.3 | — | — |

Examples 13–16

Preparation of Polyurethane Foams Using Blowing Agent Mixtures Comprising 1,1-Dichloro-1-fluoroethane (R-141b), Water, and One of Various Unsaturated Perfluorochemical Compounds Polyurethane foams were prepared essentially according to the procedure of Example 1, using the components and amounts listed in Table 3. (Polyol 1832 A/2, commercially available from Bayer AG as Baytherm™ VP-PU 1832 A/2, is a polyether polyol having a hydroxy equivalent weight of 520 mg KOH/g, a water content of about 1.9 pbw, a catalyst content of 3.7 pbw of N,N-dimethylcyclohexyl amine, and a viscosity of about 4000 cp.) 1,1-Dichloro-1-fluoroethane (available from both Atochem and Allied-Signal) was used in each case as a co-blowing agent. The density, cell size, and thermal conductivity data for the resulting foams are shown in Table 3.

Comparative Example G

Preparation of Polyurethane Foam Using a Blowing Agent Mixture Comprising Only 1,1-Dichloro-1-fluoroethane (R-141b) and Water A polyurethane foam was prepared essentially as in Examples 13–16 (the components and their amounts are given in Table 3) but without the addition of unsaturated perfluorochemical. The density, cell size, and thermal conductivity data for the resulting foam are shown in Table 3. This data (when compared with the data for Examples 13–16) indicates that foamable compositions of the present invention comprising unsaturated perfluorochemical blowing agent compound can provide foams having a smaller average cell size than foams prepared using 1,1-dichloro-1-fluoroethane and water as the sole blowing agents.

Comparative Example H

Preparation of Polyurethane Foam Using a Blowing Agent Mixture Comprising Only Pentane and Water A polyurethane foam was prepared essentially as in Examples 17–19 (the components and their amounts are given in Table 4) but without the addition of perfluoroolefin compound. The density and thermal conductivity data for the resulting foam are shown in Table 4. This data (when compared with the data for Examples 17–19) indicates that foamable compositions of the present invention comprising unsaturated perfluorochemical blowing agent compound can provide foams having thermal conductivities superior or equivalent to those of foams prepared using pentane and water as the sole blowing agents.

Comparative Example I

Preparation of Polyurethane Foam Using a Blowing Agent Mixture Comprising a Hydrogen-Containing, Unsaturated Fluorochemical Compound, Pentane, and Water A polyurethane foam was prepared essentially as in Examples 17–19 (the components and their amounts are given in Table 4), except that a hydrogen-containing, unsaturated fluorochemical (namely, $CF_3(CF_2)_5$—$CH=CH_2$, disclosed in U.S. Pat. No. 5,205,956 (Volkerr et al.)) was substituted for the perfluoroolefin compound. The density and thermal conductivity data for the resulting foam are shown in Table 4. This data (when compared with the data for Examples 17–19) indicates that foamable compositions of the present invention comprising unsaturated perfluorochemical blowing agent compound can provide foams having thermal conductivities superior to those of foam prepared using incompletely-fluorinated, unsaturated compounds such as that taught by Volkert et al., supra.

TABLE 3

| | Amount of Component (Parts by Weight) Example No. | | | | |
| --- | --- | --- | --- | --- | --- |
| Component | 13 | 14 | 15 | 16 | G |
| Polyol 1832A/2 (water content of 1.9 pbw) | 118 | 118 | 118 | 118 | 118 |
| Isocyanate 44V20 | 192 | 192 | 192 | 192 | 192 |
| Silicone Surfactant B-8423 | 3.5 | 3.5 | 3.5 | 3.5 | 3.5 |
| R-141b | 36.5 | 36.5 | 36.5 | 36.5 | 36.5 |
| HFP Dimer | 3.5 | | | | |
| HFP Trimer | | 3.5 | | | |
| TFE Oligomer | | | 3.5 | | |
| $C_6F_{10}$ | | | | 3.5 | |
| Average Cell Size | Medium | Medium | Medium | Medium | Large |
| Density (kg/m³) | 40.4 | 39.3 | 39.5 | 39.6 | 39.9 |
| Initial Thermal Conductivity (mW[m(K)$^{-1}$]) | 19.3 | 18.4 | 18.4 | 19.1 | 19.0 |
| Aged Thermal Conductivity (mW[m(K)$^{-1}$]) (2 weeks at 50° C.) | 21.9 | 20.5 | 21.4 | 22.1 | 21.7 |

Examples 17–19

Preparation of Polyurethane Foams Using Blowing Agent Mixtures Comprising Perfluoroolefin Compound, Pentane, and Water Polyurethane foams were prepared essentially according to the procedure of Example 1, using the components and amounts listed in Table 4. Pentane and water were used in each case as co-blowing agents. The density and thermal conductivity data for the resulting foams are shown in Table 4.

TABLE 4

| Component | Amount of Component (Parts by Weight) Example No. | | | | |
|---|---|---|---|---|---|
| | 17 | 18 | 19 | H | I |
| Polyol 1832A/2 (water content of 1.9 pbw) | 122 | 122 | 122 | 122 | 122 |
| Isocyanate 44V20 | 190 | 190 | 190 | 190 | 190 |
| Silicone Surfactant B-8423 | 3.5 | 3.5 | 3.5 | 3.5 | 3.5 |
| Pentane | 15 | 15 | 15 | 15 | 15 |
| HFP Dimer | 3.5 | | | | |
| HFP Trimer | | 3.5 | | | |
| TFE Oligomer | | | 3.5 | | |
| $CF_3(CF_2)_5$—CH=$CH_2$ | | | | | 3.5 |
| Density (kg/m$^3$) | 39.12 | 38.63 | 39.76 | 38.54 | 40.37 |
| Initial Thermal Conductivity (mW[m(K)$^{-1}$]) | 20.0 | 20.5 | 20.3 | 20.3 | 22.4 |
| Aged Thermal Conductivity (mW[m(K)$^{-1}$]) (2 weeks at 50° C.) | 22.8 | 22.0 | 22.4 | 23.6 | 24.8 |

Example 20

Preparation of a Phenolic Foam Using a Blowing Agent Mixture Comprising Perfluoroolefin Compound and Conventional Co-blowing Agents A phenolic foam was prepared essentially as in Example 1 of European Pat. Publication No. 0 439 283 A1 (BP Chemicals Limited), except that HFP trimer (Hoechst AG) was substituted for the perfluoropentane. The resulting foam was stable (no collapse) and had a large cell size.

Various modifications and alterations of this invention will become apparent to those skilled in the art without departing from the scope and spirit of this invention.

We claim:

1. A foamable composition comprising (a) at least one normally liquid, unsaturated perfluorochemical blowing agent compound selected from the group consisting of fluoropropene dimers, hexafluoropropene trimers, tetrafluoroethylene oligomers, perfluoro(3-oxahex-1-ene), perfluoro (3-oxahept-1-ene), and perfluoro (3-oxa-4-methylpent-1-ene), and mixtures thereof; and (b) at least one foamable polymer or the precursors of at least one foamable polymer.

2. The composition of claim 1 wherein said blowing agent compound is present in an amount up to about 30 percent by weight of said foamable composition.

3. The composition of claim 1 further comprising at least one other blowing agent compound.

4. The composition of claim 1 further comprising at least one surfactant.

5. The composition of claim 1 wherein said precursors comprise (a) at least one organic polyisocyanate; and (b) at least one compound containing at least two reactive hydrogen atoms.

6. The composition of claim 5 wherein said polyisocyanate is selected from the group consisting of aromatic diisocyanates.

7. The composition of claim 5 wherein said compound containing at least two reactive hydrogen atoms is a polyol.

8. The composition of claim 7 wherein said polyol contains from 2 to about 50 hydroxyl groups.

9. The composition of claim 5 further comprising at least one other blowing agent compound.

10. The composition of claim 5 further comprising at least one surfactant.

11. The composition of claim 5 further comprising at least one cross-linking or chain-extending agent.

12. The composition of claim 5 further comprising at least one catalyst.

13. A polymeric foam comprising the composition of claim 1 or the reaction product of said composition.

14. An article comprising the foam of claim 13.

15. A process for preparing polymeric foam comprising the step of vaporizing at least one normally liquid, unsaturated perfluorochemical blowing agent compound in the presence of at least one foamable polymer or the precursors of at least one foamable polymer, said blowing agent compound being selected from the group consisting of hexafluoropropene dimers, hexafluoropropene trimers, tetrafluoroethylene oligomers, perfluoro(3-oxahex-1-ene), perfluoro (3-oxahept-1-ene), and perfluoro (3-oxa-4-methylpent-1-ene), and mixtures thereof.

16. A polymeric foam prepared by the process of claim 15.

17. An article comprising the foam of claim 16.

18. A foamable composition comprising (a) at least one normally liquid, unsaturated perfluorochemical blowing agent compound selected from the group consisting of hexafluoropropene dimers, hexafluoropropene trimers, tetrafluoroethylene oligomers, and mixtures thereof; (b) at least one organic polyisocyanate; and (c) at least one polyol.

* * * * *